(12) United States Patent  (10) Patent No.: US 8,192,214 B2
Liao et al.                 (45) Date of Patent: Jun. 5, 2012

(54) LAMP SOCKET

(75) Inventors: Chia-Hong Liao, Taichung County (TW); Wei-Chen Hsu, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 360 days.

(21) Appl. No.: 12/354,785

(22) Filed: Jan. 16, 2009

(65) Prior Publication Data

US 2010/0103647 A1    Apr. 29, 2010

(30) Foreign Application Priority Data

Oct. 28, 2008  (TW) ................. 97141332 A

(51) Int. Cl.
    *H01R 33/02*   (2006.01)
(52) U.S. Cl. ........................................... 439/232
(58) Field of Classification Search ........... 439/232; 362/249.01, 396, 97.1, 97.2
    See application file for complete search history.

(56) References Cited

U.S. PATENT DOCUMENTS

| | | | | |
|---|---|---|---|---|
| 5,907,218 A * | 5/1999 | Altman et al. | ................ | 315/56 |
| 7,086,775 B2 * | 8/2006 | Huang et al. | ................ | 362/652 |
| 7,090,376 B2 * | 8/2006 | Kang et al. | ................ | 362/225 |
| 7,278,754 B2 | 10/2007 | Kim | | |
| 7,364,344 B2 * | 4/2008 | Chang | ................ | 362/633 |
| 7,549,881 B2 * | 6/2009 | Cho et al. | ................ | 439/235 |
| 7,556,515 B2 * | 7/2009 | Kato et al. | ................ | 439/171 |
| 7,559,686 B2 * | 7/2009 | Chang et al. | ................ | 362/652 |
| 7,637,625 B2 * | 12/2009 | Kwon et al. | ................ | 362/97.2 |
| 7,645,152 B2 * | 1/2010 | Tsai | ................ | 439/228 |
| 7,771,106 B2 * | 8/2010 | Yang et al. | ................ | 362/634 |
| 7,810,943 B2 * | 10/2010 | Ko et al. | ................ | 362/97.2 |
| 2005/0083675 A1 * | 4/2005 | Huang et al. | ................ | 362/31 |
| 2005/0141220 A1 * | 6/2005 | Kim et al. | ................ | 362/240 |
| 2005/0265047 A1 * | 12/2005 | Yun et al. | ................ | 362/611 |
| 2006/0250821 A1 * | 11/2006 | Kang et al. | ................ | 362/657 |
| 2007/0037426 A1 | 2/2007 | Miyazono | | |
| 2008/0024068 A1 | 1/2008 | Cho | | |
| 2008/0074576 A1 * | 3/2008 | Cho et al. | ................ | 349/58 |
| 2008/0080182 A1 * | 4/2008 | Yang et al. | ................ | 362/249 |
| 2008/0084696 A1 * | 4/2008 | Yang et al. | ................ | 362/249 |
| 2008/0094849 A1 * | 4/2008 | Lu | ................ | 362/396 |
| 2008/0102711 A1 * | 5/2008 | Yang et al. | ................ | 439/660 |
| 2008/0106900 A1 * | 5/2008 | Chang et al. | ................ | 362/249 |
| 2008/0146060 A1 * | 6/2008 | Kato et al. | ................ | 439/171 |
| 2008/0207063 A1 | 8/2008 | Handa | | |
| 2009/0196055 A1 * | 8/2009 | Tsai | ................ | 362/396 |
| 2009/0257216 A1 * | 10/2009 | Cho et al. | ................ | 362/97.1 |
| 2009/0279281 A1 * | 11/2009 | Chung et al. | ................ | 362/97.1 |
| 2010/0008065 A1 * | 1/2010 | Naito | ................ | 362/97.1 |
| 2010/0055976 A1 * | 3/2010 | Ohmori et al. | ................ | 439/567 |

FOREIGN PATENT DOCUMENTS

TW          200827610       7/2008

* cited by examiner

*Primary Examiner* — Amy Cohen Johnson
*Assistant Examiner* — Vladimir Imas
(74) *Attorney, Agent, or Firm* — Winston Hsu; Scott Margo

(57) ABSTRACT

The invention provides a lamp socket of a backlight module. The lamp socket comprises a lamp holder and an insulation sheet. The lamp holder comprises a lamp clamp, a holder connector and an inverter connector. Specially, the lamp clamp and the holder connector define a first groove where the insulation sheet can lodge in.

24 Claims, 10 Drawing Sheets

LAMP SOCKET

BACKGROUND OF THE INVENTION

1. Field of the Invention

The present invention discloses a lamp socket, more particularly, a simple and easy-to-fabricate lamp socket.

2. Description of the Prior Art

As technology develops, more and more display technology has been built up and under application. The LCD panel with the advantages of small-size, low-power-consumption and low-radiation has become popular in the field of desktops, laptops or some mobile products such as PDA, thus has replaced the CRT in the recent years. Because the liquid crystal molecular does not emit light by itself, a light source is needed, for example, a backlight module.

Please refer to FIG. 1, illustrating a conventional backlight module. A backlight module 1 comprises a containing box 11, a plurality of lamps 13 and a plurality of optical films 17. The containing box 11 is used to contain and support the lamps 13 and comprises a bottom plate 111 and a plurality of side walls 113 disposed on the edges of the bottom plate 111. The optical films 17 are disposed between the lamps 13 and the LCD panel (not shown), making light scatter and evenly-dispersed when passing through the optical films 17.

The lamp 13 is usually a cold cathode fluorescent lamp (CCFL) which is disposed in the containing box 11 and each end of the lamps 13 passes through the holes on the side walls 113. Each end of the lamps 13 comprises an electrode 131. When applying a voltage to the electrode 131, the lamp 13 will emit light. For delivering the electrics, the electrode 131 connects one side of a conducting line 133, wherein the other side of the conducting line 133 bends to the underside of the bottom plate 111 and connects to the inverter (not shown) of a driving circuit. When the driving circuit applies a voltage, the current passes through the inverter (not shown), the conducting line 133 and the electrode 131, the lamp 13 therefore emits light. However, the connection between the electrode 131, the conducting line 133 and the inverter (not shown) is achieved by welding which is usually expensive, hard to fabricate and easy to fall off.

U.S. Pat. No. 7,278,754 discloses a structure to hold lamps that needs no welding. It provides a common electrode that connects each electrode of the lamps and the common electrode further comprises conducting lines to connect the inverter. It can therefore decrease the welding charge. However, the connection between the conducting line, the common electrode and the inverter is still done by welding which makes it easy to fall off and hard to fabricate.

Therefore, it is still needed to have a lamp socket that is easy to fabricate and needs no welding.

SUMMARY OF THE INVENTION

The present invention provides a novel lamp socket that is easy to fabricate and needs no welding.

According to the claimed invention, the invention provides a lamp socket of a backlight module. The lamp socket comprises a lamp holder and an insulation sheet. The lamp holder comprises a lamp clamp, a holder connector and an inverter connector. Specially, the lamp clamp and the holder connector define a first groove where the insulation sheet can lodge in.

The present invention provides an efficient and convenient structure to hold the lamp and prevent its shaking. The present invention further provides an insulation environment to prevent fire occurrence.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
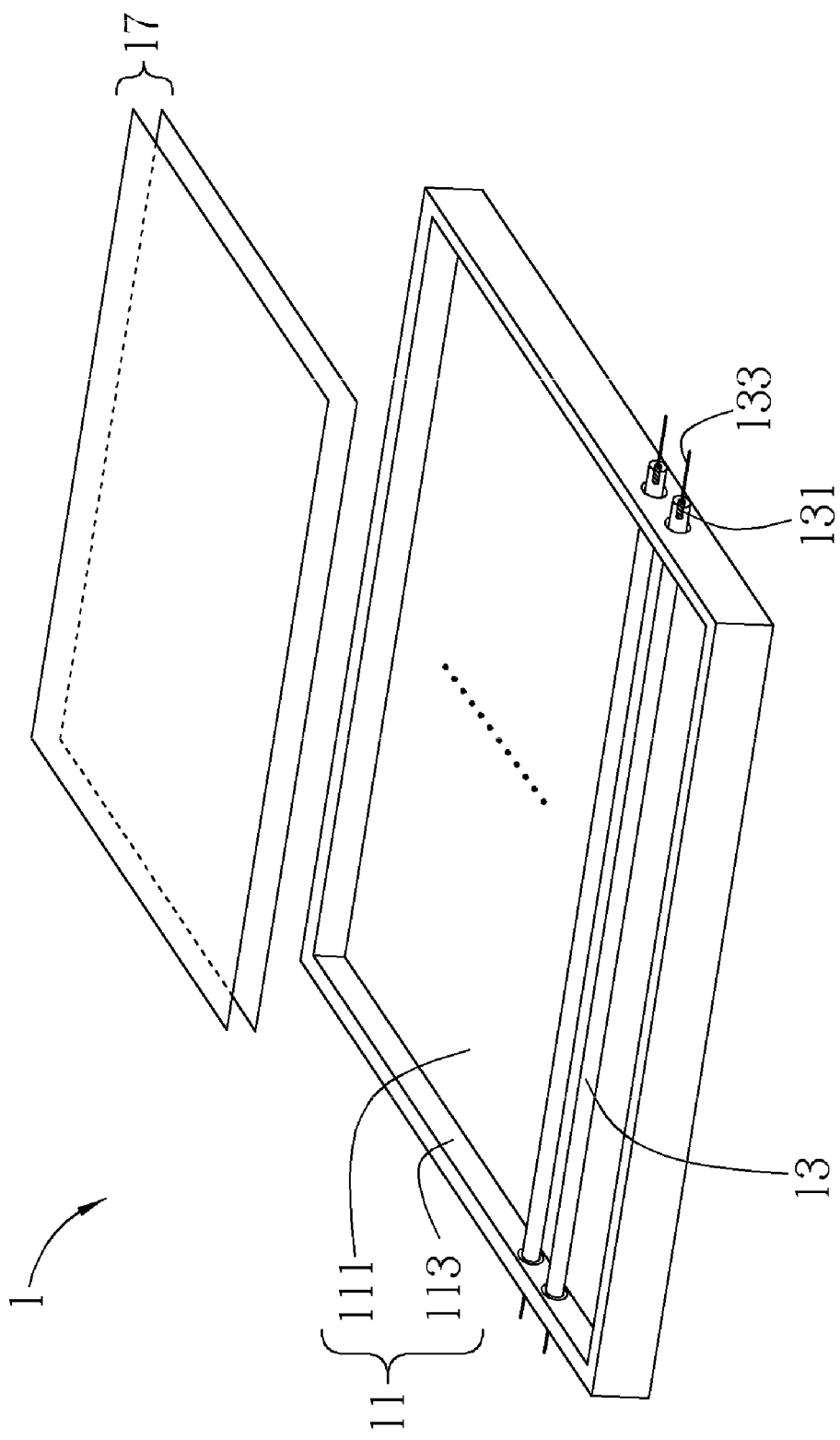
FIG. 1 is the schematic diagram illustrates a conventional backlight module.
Figure 2:
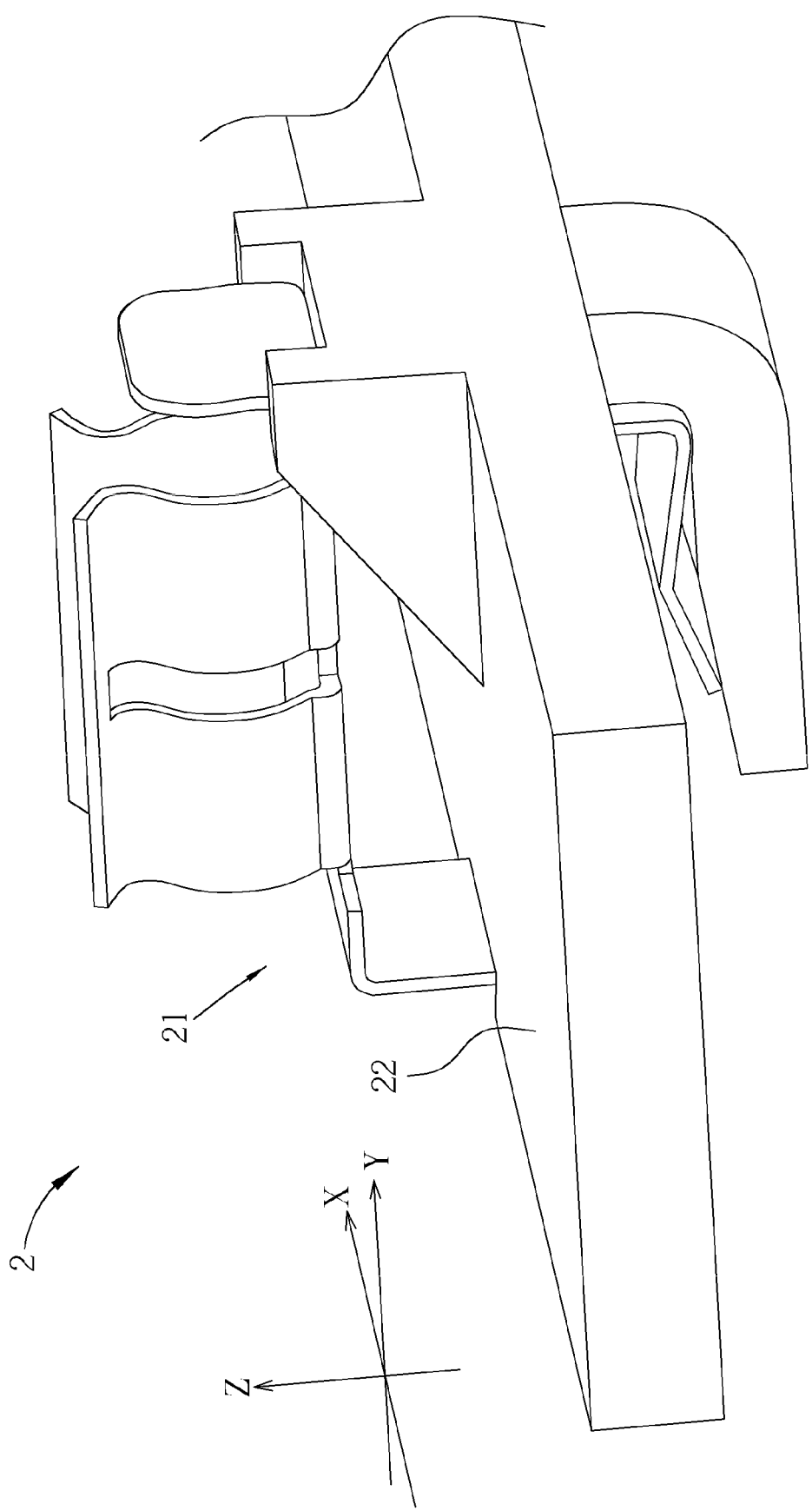
FIG. 2 is a schematic diagram illustrates the lamp socket in the present invention.

Please refer to FIG. 2 that is a schematic diagram illustrates the lamp socket structure in the present invention. As shown in FIG. 2, the lamp socket 2 comprises a lamp holder 21, an insulation sheet 22. The lamp holder 21 is made of conductive material, for example, copper or other conductive metal, to electrically connect the lamp and the inverter (not shown), making the electrics pass from the inverter to the lamp holder 21 and finally to the lamp. The insulation sheet 22 is used to hold the lamp holder 21 and fix the lamp socket 2 onto the bottom plate (not shown) of the backlight module. The detail structure of the lamp holder 21 and the insulation sheet 22 will be described below.

Figure 3:
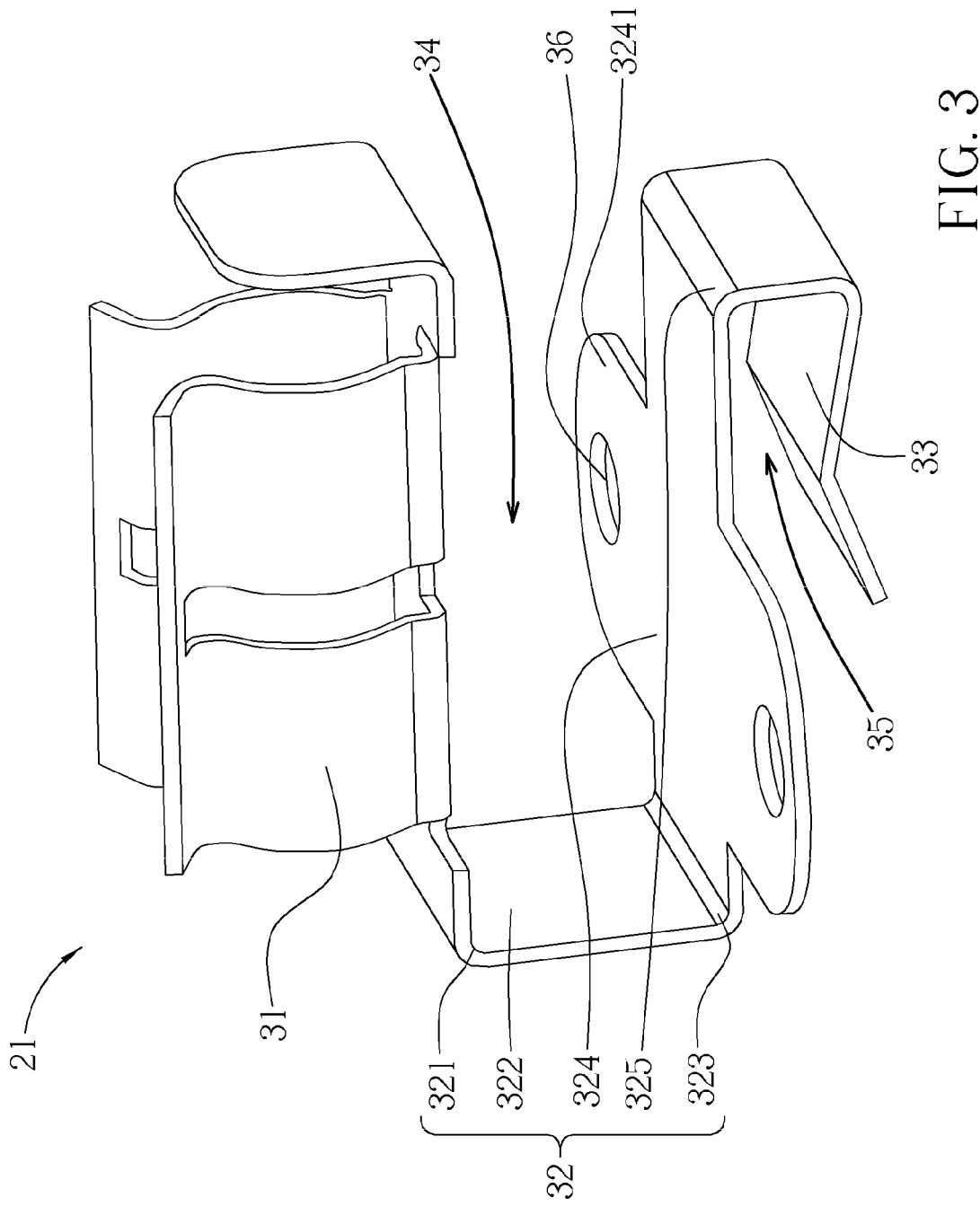
FIG. 3 is a schematic diagram illustrates the lamp holder in the present invention.

Please refer to FIG. 3, showing a schematic diagram of the lamp holder 21 in the present invention. As shown in FIG. 3, the lamp holder 21 comprises a lamp clamp 31, a holder connector 32 and an inverter connector 33. The lamp clamp 31 contacts and holds the lamp (not shown) and electrically coupled with the electrode of the lamp. The lamp clamp 31 is made of conductive material and may be in the form of lamp metal nut, lamp metal sheath, conducting wire or other forms that can electrically connect the lamp electrode, but should not be limited to those specified above. FIG. 3 shows one example of the lamp holder 31 being a lamp metal nut.

The holder connector 32 connects to the lamp clamp 31 and the inverter connector 33 on each side respectively. The holder connector 32 in series comprises a first bending part 321, a first plank part 322 that connects one side of the first bending part 321, a second bending part 323 that connects one side of the first plank part 322, a second plank part 324 that connects one side of the second bending part 323, a third bending part 325 that connects one side of the second plank part 324. The other side of the first bending part 321 further connects the lamp clamp 31 and the other side of the third bending part 325 further connects the inverter connector 33, as shown in FIG. 3. Approximately, the first bending part 321, the second bending part 323 and the third bending part 325 bend perpendicularly, but the bending angle is not limited to 90° but may be adjusted under different occasions.

The lamp holder 21 further comprises a first groove 34 and a second groove 35. Please refer to FIG. 3, the first groove 34 is defined by the lamp clamp 31 and the holder connector 32 and is surrounded by the lamp clamp 31, the first bending part 321, the first plank part 322, the second bending part 323 and the second plank part 324. The second groove 35 is defined by the holder connector 32 and the inverter connector 33 and is surrounded by the second plank part 324, the third bending part 325 and the inverter connector 33. As a result, the first groove 34 and the second groove 35 have opposite opening directions. When fabrication, the first groove 34 is used for the insulation sheet 22 to lodge in, thereby making the insulation sheet 22 fixed onto the first groove 34 of the lamp holder 21. The second groove 35 is used for the inverter (not shown) to lodge in which becomes the electrical input of the lamp socket 2.

Figure 4:
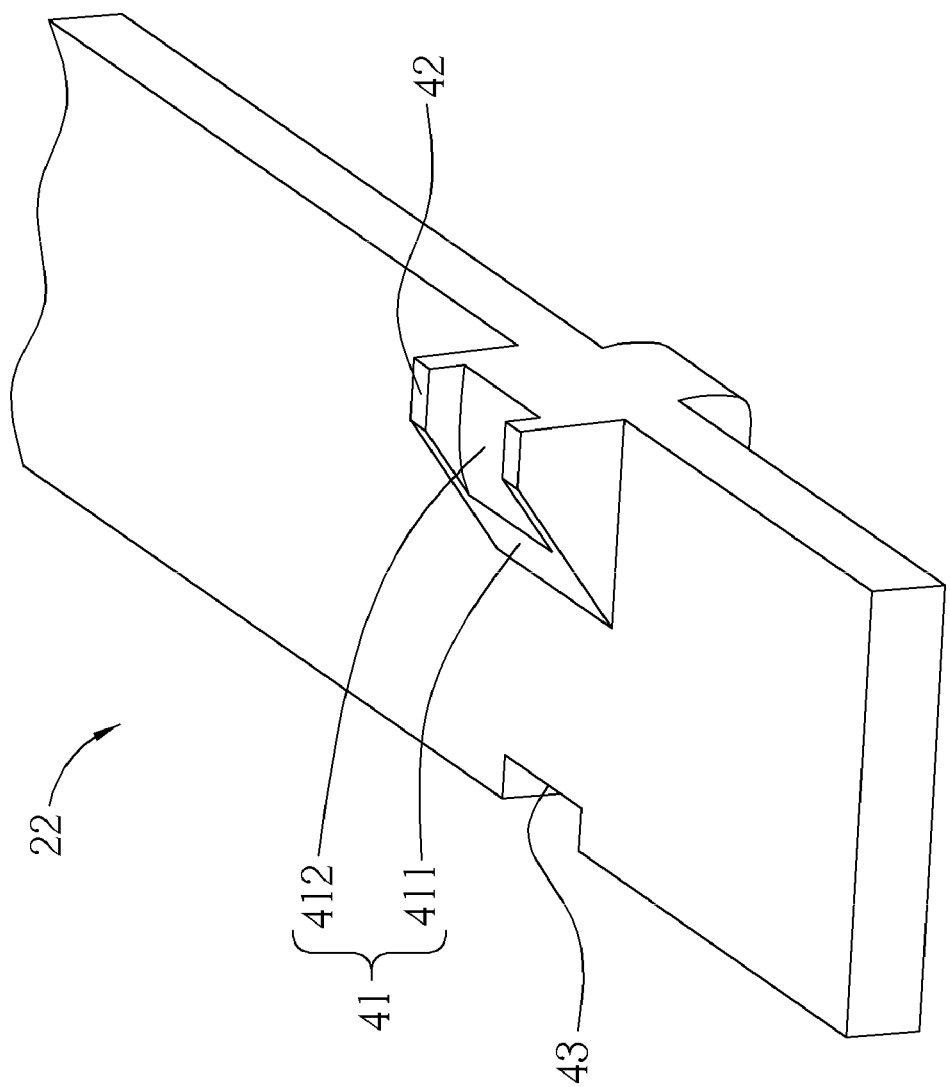
FIG. 4 is a schematic diagram illustrates the top view of the insulation sheet in the present invention.

Please refer to FIG. 4 and also in FIGS. 2 and 3, wherein FIG. 4 is a schematic diagram illustrates the top view of the insulation sheet in the present invention. To ensure the insulation sheet 22 can be fixed firmly onto the first groove 34 of the lamp holder 21 when fabricating, the insulation sheet 22 comprises a leading incline 41, a set of lumps 42 and a gap 43. As shown in FIG. 4, the leading incline 41 is disposed on one surface of the insulation sheet 22 and comprises an incline part 411 and a plateau part 412. When fabricating, the insulation sheet 22 is put toward the first groove 34, the lamp clamp 31 therefore slides along the incline part 411 upward and reaches the plateau part 412 where it is being fixed, as shown in FIG. 2. Furthermore, a set of lumps are disposed on two sides of the plateau part 412 to help fix the lamp holder 21 and prevent its movement in the left-and-right direction. Besides, the insulation sheet 22 further comprises a gap 43 that opens on the side where the incline part 411 extends to. When pushing the lamp holder 21 deep to the first groove 34, it helps to fix the lamp holder 21 in the left-and-right direction.

Figure 5:
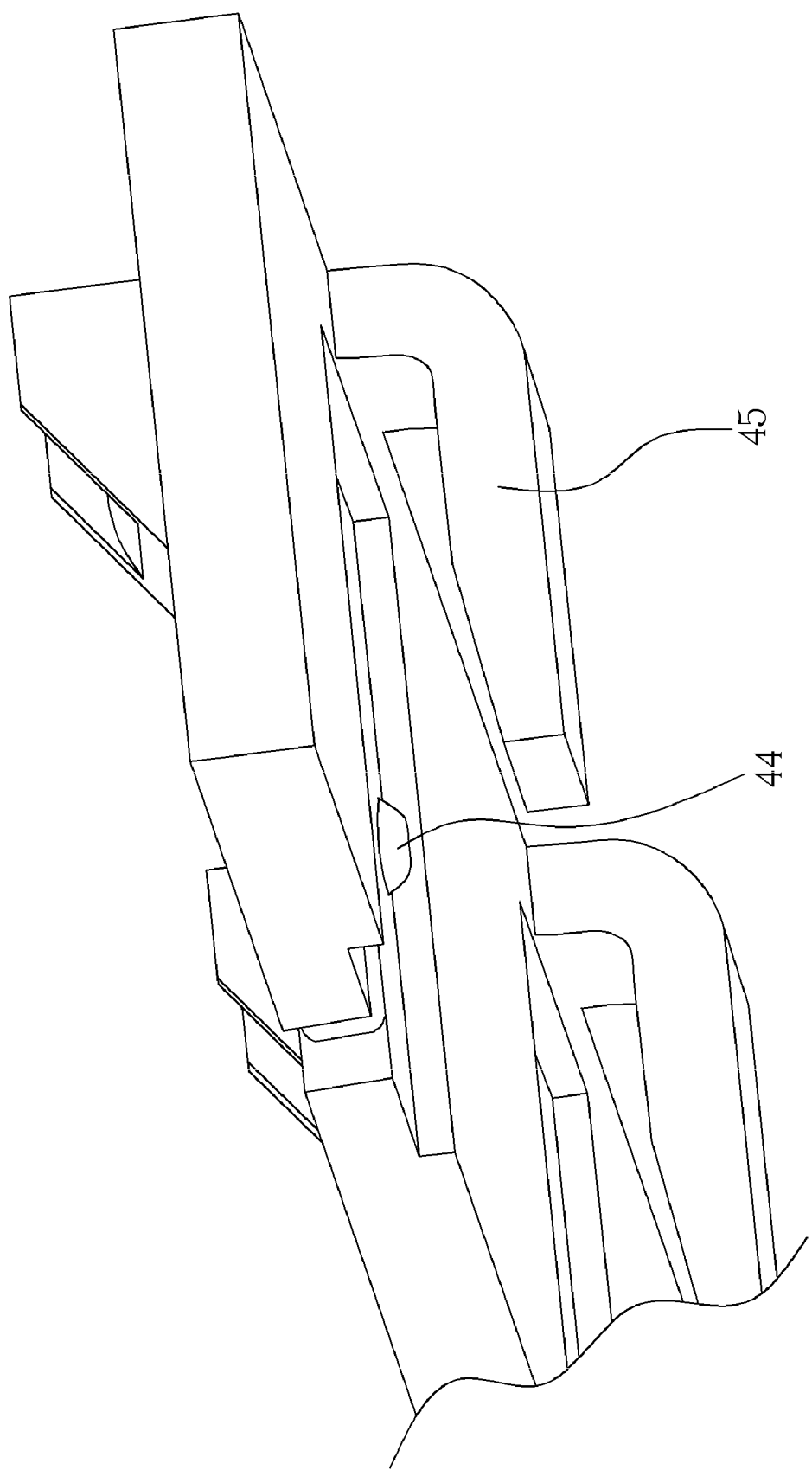
FIG. 5 is a schematic diagram illustrates the bottom view of the insulation sheet in the present invention.
Figure 6:
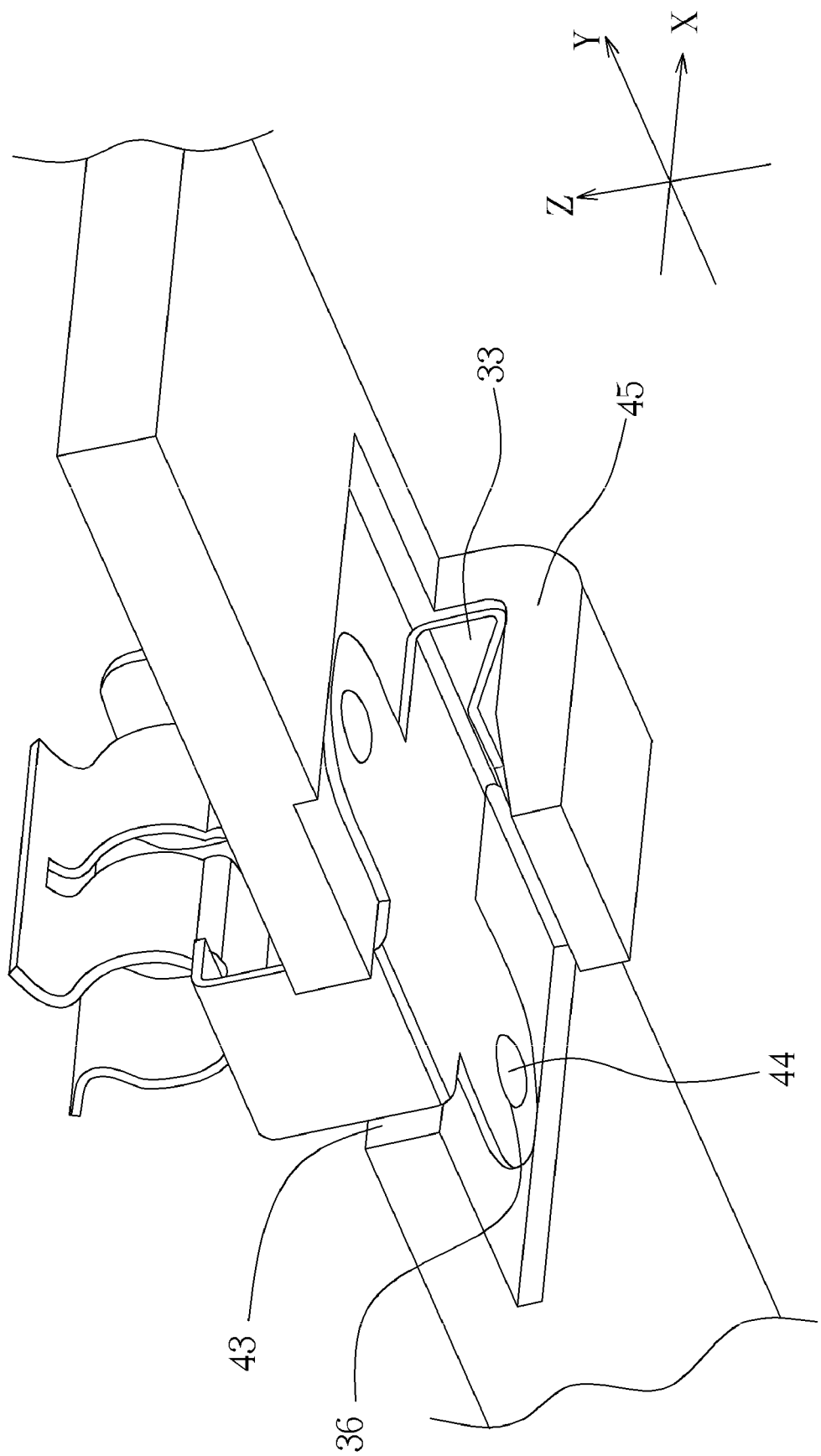
FIG. 6 is a schematic diagram illustrates the bottom view of the arrangement of the insulation sheet and the lamp holder in the present invention.

Please refer to FIGS. 3, 5 and 6, wherein FIG. 5 is a schematic diagram illustrates the bottom view of the insulation sheet 22 in the present invention. To ensure the combination between the lamp holder 21 and the insulation sheet 22, the insulation sheet 22 and the lamp holder 21 further comprise at least one aperture 36 and protruding point 44. First, please refer to FIG. 3, the second flank part 324 of the holder connector 32 comprises at least one aperture 36. In the preferred embodiment of the present invention, the aperture is disposed on the wing regions 3241 that are on two sides of the second flank part 324. Next, as shown in FIG. 5, the insulation sheet 22 comprises at least one protruding point 44 on the bottom side of the insulation sheet 22. When fabricating, if the lamp holder 21 is placed on the appropriate position, the protruding point 44 of the insulation sheet 22 will be locked in each of the corresponding aperture 36 of the lamp holder 21, as shown in FIG. 6. Thus the lamp holder 21 is immovable with the combination of the protruding point 44 and the aperture 36.

Figure 7:
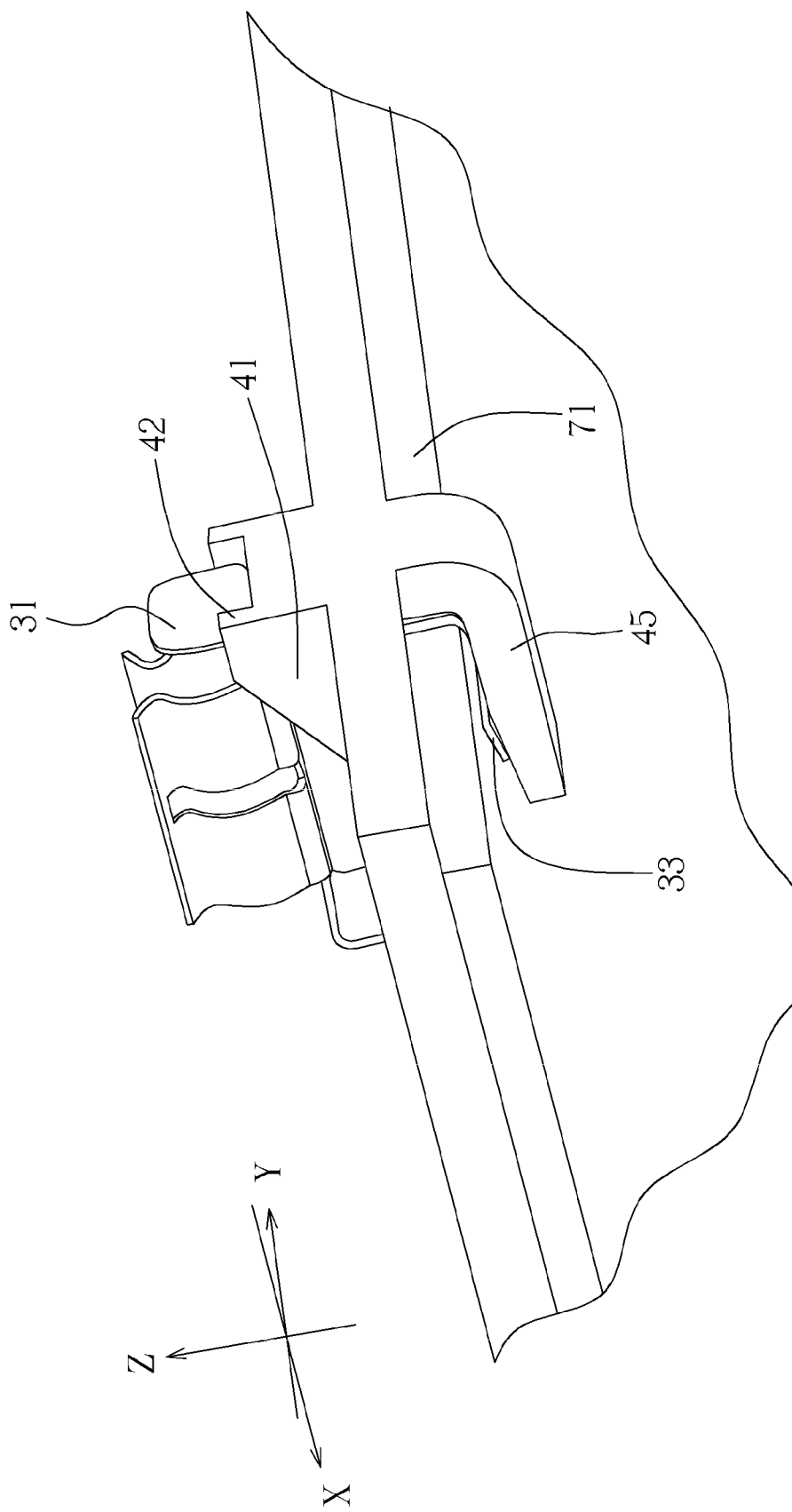
FIG. 7 is a schematic diagram illustrates the arrangement of the lamp holder, the insulation sheet and the inverter.

Please again refer to FIGS. 5, 6 and 7, wherein FIG. 7 is a schematic diagram illustrates the combination of the lamp holder 21, the insulation sheet 22 and the inverter 71. As shown in FIG. 5, the insulation sheet 22 comprises a supporting part 45 disposed on the bottom side of the insulation sheet 22. The supporting part 45 has a bending stripe structure which contacts and supports the bottom of the inverter connector 33, as shown in FIG. 6. Please refer to FIG. 7, because the second groove 35 is used to contain the inverter 71, when the inverter 71 lodges in the second groove 35 and holds the inverter connector 35 open, after a period of time, it may cause the inverter connector 33 to permanently change its shape, and therefore lose contact. Accordingly, the supporting part 45 of the insulation sheet 22 can help to support the structure and the shape of the inverter connector 33, reduce the possibility of failure-contact, and further provide an insulation environment that prevents the fire occurrence between the lamp holder 21 and the inverter connector 33.

According to the novel structure of the clamp holder 21 and the insulation sheet 22, the present invention provides a good fixing module to stabilize the clamp holder 21 and the insulation sheet 22 in a three-axis (x, y z) confinement. Please refer to FIGS. 6 and 7, regarding to the x-axis, the lumps 42, the gap 43 and the protruding points 44 on the insulation sheet 22 can help stabilize the lamp holder 22 in the x-axis. Regarding the y-axis, the supporting part 44 supports the inverter connector 33, thereby stabilizing it in one direction of the y-axis. After fabricating the lamp holder 21 and the insulation sheet 22, the inverter lodges in the second groove 35, thereby stabilizing in another direction of the y-axis. Regarding to the z-axis, the leading incline 41 contacts the lamp clamp 31 and the supporting part 45 contacts the inverter connector 33, thereby stabilizing in the z-axis. Accordingly, the lamp socket 2 in the present invention can achieve a three-axis (x, y, z) confinement therefore stabilize the lamp holder 21, the insulation sheet 22 and the inverter 71.

Figure 8A:
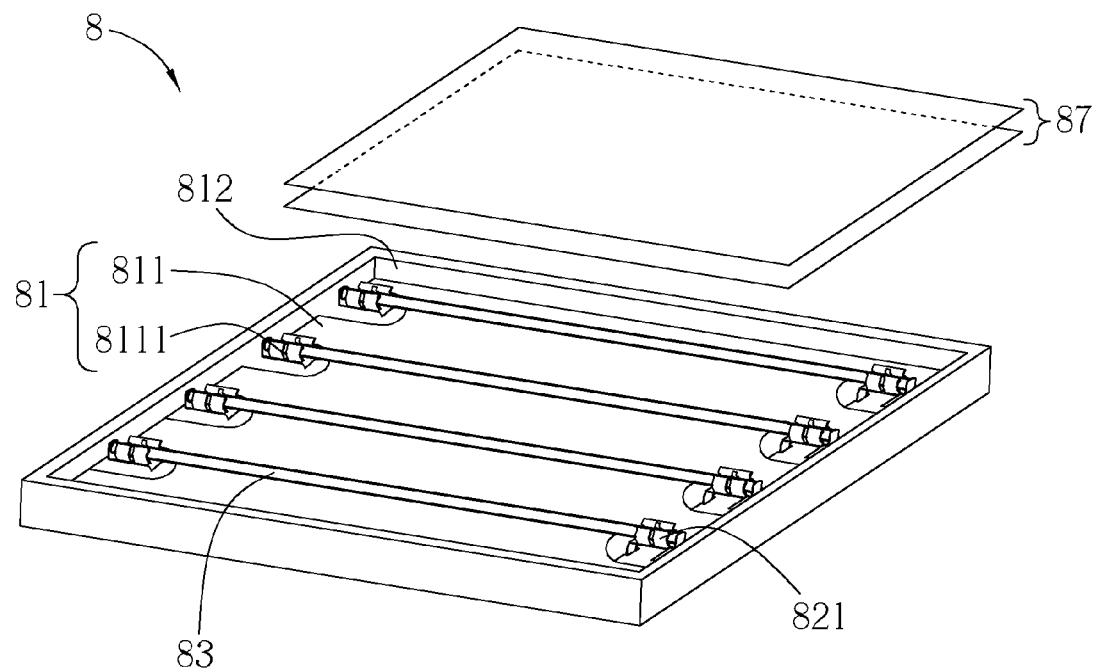
FIGS. 8a and 8b are schematic diagrams illustrate the top and bottom view of the backlight module in the present invention.
Figure 8B:
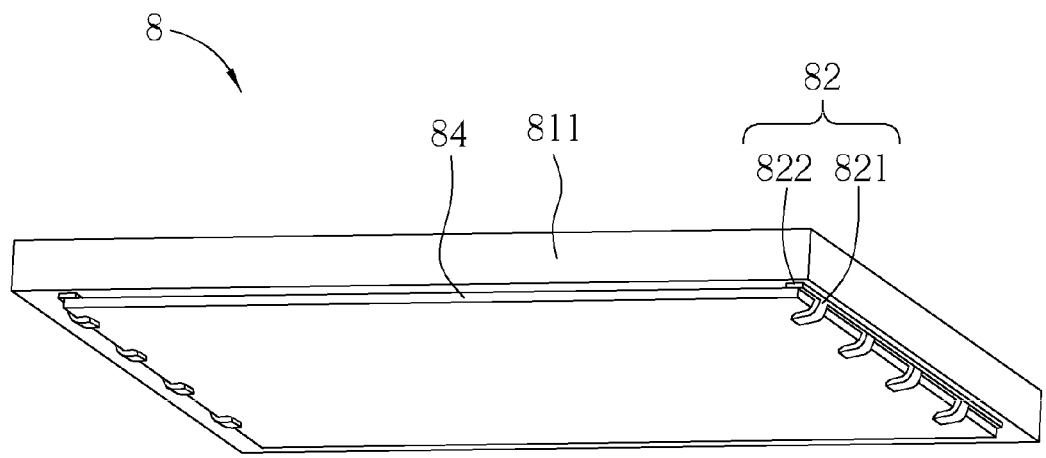

Please refer to FIGS. 8a and 8b, wherein FIG. 8a is a schematic diagram illustrates the top view of the backlight module in the present invention and FIG. 8b is a schematic diagram illustrates the bottom view of the backlight module in the present invention. The backlight module 8 comprises a containing box 81, two sets of lamp sockets 82, a plurality of lamps 83, an inverter 84 and a plurality of optical sheets 74. The containing box 81 comprises a bottom plate 811 and a plurality of side walls 812 disposed on the edges of the bottom plate 811 and the bottom plate 811 has a plurality of openings 8111. Two sets of the lamp socket 82 are fixed on each two sides of the bottom plate 811 respectively. Each lamp sockets 82 comprises a plurality of lamp holders 821 and an insulation sheet 822. The insulation sheet 822 is locked on the bottom side of the bottom plate 811, and makes each lamp holder 821 pass through each corresponding openings 8111 of the bottom plate 811. Each lamp 83 is fixed by each corresponding lamp holder 821 onto the upper side of the bottom plate 811. The backlight module 8 comprises an inverter 84 which is fixed on the bottom side of the bottom plate 811 by the lamp socket 82. Besides, the backlight module 8 further comprises a plurality of optical sheets 87, for example, diffusers or prism sheets, which are disposed between the lamps 83 and the LCD panel (not shown), making light scatter when passing through the optical sheets 87 to obtain an even light source and increase the light using efficiency.

The lamp holder 821 and the insulation sheet 822 are of the same structure as the lamp socket 2 described above, for the sake of simplicity, it is not described herein.

Figure 9A:
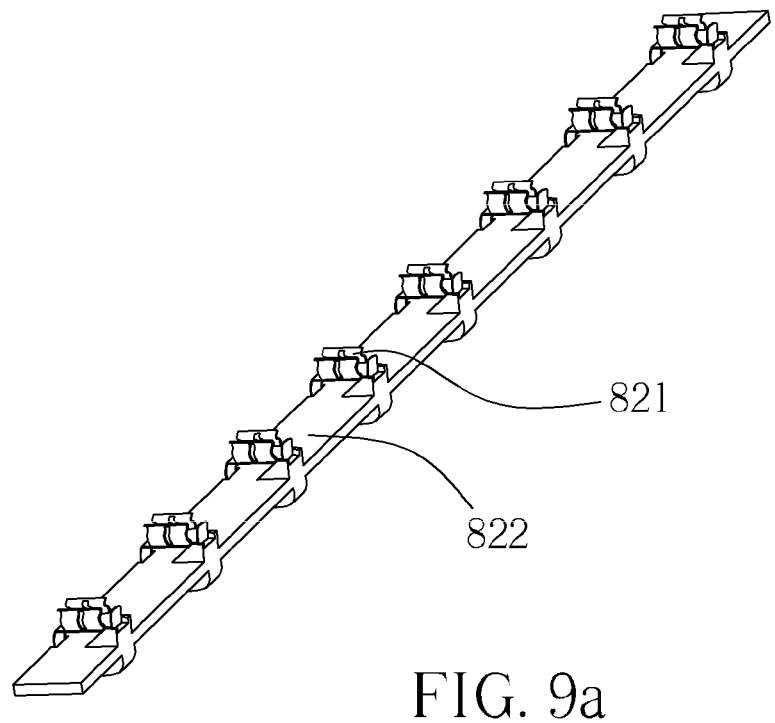
FIG. 9a to 9c are schematic diagrams illustrate the steps for fabricating the backlight module in the present invention.
Figure 9B:
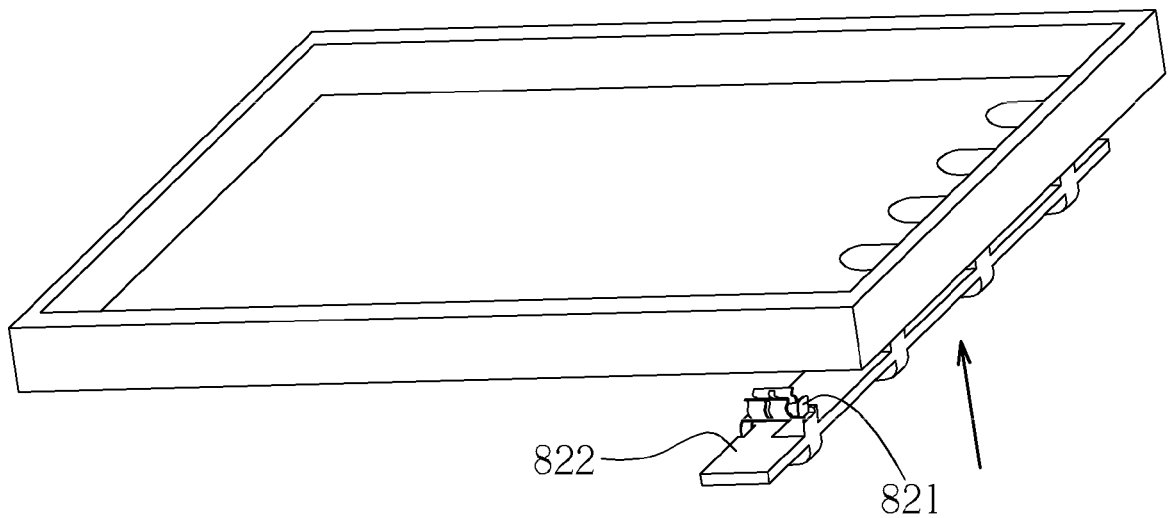
Figure 9C:
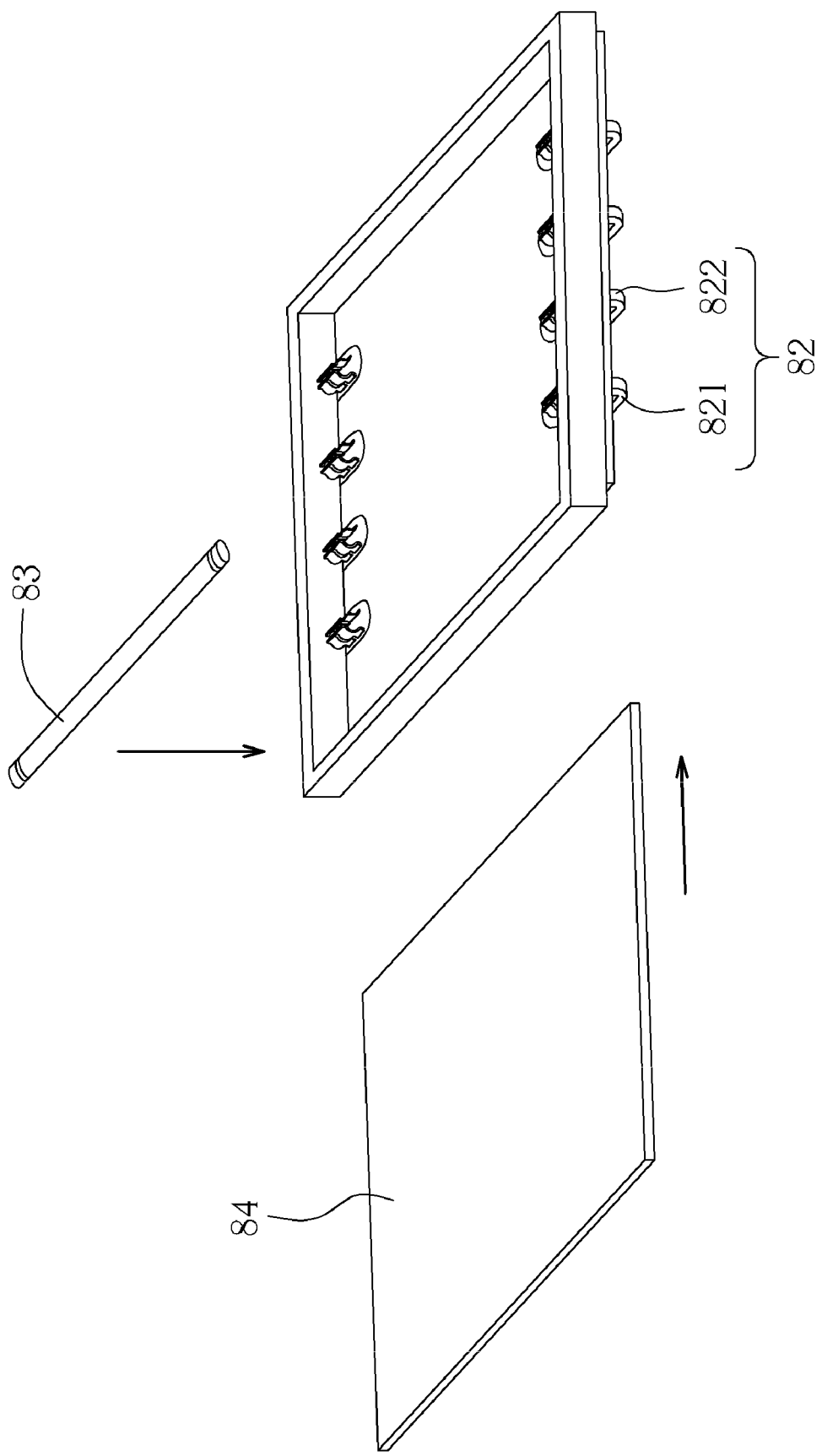

Please refer to FIG. 9a to 9c, showing schematic diagrams illustrate the steps for fabricating the backlight module 8 in the present invention. First, refer to FIG. 9a, each of the lamp holders 821 are fixed onto appropriate positions of the insulation sheet 822. Next, refer to FIG. 9b, each of the lamp socket 82 are put on the bottom side of the bottom plate 811 and the insulation sheet 822 is locked on the bottom plate 811. Refer to FIG. 9c, the inverter 84 is inserted into the lamp socket 82 in the direction of the arrow and the lamps 83 are put onto each of the lamp sockets 82. According to the aforesaid steps, the lamp socket 82 and the backlight module 8 are easy to fabricate. It needs only to fabricate the lamp holder 821 and the insulation sheet 822 in advance, lock the insulation sheet 822 onto the bottom plate 811 and at last insert the inverter 84 thereby complete the structure. The novel structure has a three-axis confinement making the backlight module hard to fall off and decreasing the cost of welding and conducting lines.

Those skilled in the art will readily observe that numerous modifications and alterations of the device and method may be made while retaining the teachings of the invention.

What is claimed is:

1. A lamp socket, comprising:
   a lamp holder that comprises:
      a lamp clamp;
      a holder connector that connects the lamp clamp, wherein the lamp clamp and the holder connector define a first groove which is disposed therebetween; and
      an inverter connector that connects the holder connector, wherein the holder connector and the inverter connector defines a second groove; and
   an insulation sheet that lodges in the first groove, wherein the insulation sheet is electrically insulated from the lamp holder.

2. The lamp socket of claim 1, wherein the holder connector comprises:
   a first bending part;
   a first plank part that connects one side of the first bending part;
   a second bending part that connects one side of the first plank part;
   a second plank part that connects one side of the second bending part;
   a third bending part that connects one side of the second plank part;
   wherein the other side of the first bending part connects the lamp clamp and the other side of the third bending part connects the inverter connector.

3. The lamp socket of claim 2, wherein the first groove is surrounded by the lamp clamp, the first bending part, the first plank part, the second bending part and the second plank part.

4. The lamp socket of claim 3, wherein the first bending part, the second bending part and the third bending part bend perpendicularly.

5. The lamp socket of claim 2, wherein the second plank part comprises at least one aperture and the insulation sheet comprises at least one protruding point that lodges in each of the corresponding aperture respectively.

6. The lamp socket of claim 5, wherein the second plank part comprises at least one wing region on two sides of the second plank part and the aperture is disposed on the wing regions.

7. The lamp socket of claim 1, wherein the insulation sheet comprise a leading incline that contacts the lamp clamp.

8. The lamp socket of claim 7, wherein the leading incline comprises a set of lumps disposed on two sides of the leading incline to help fix the lamp clamp onto the leading incline.

9. The lamp socket of claim 1, wherein the insulation sheet comprises a gap that holds and fixes the holder connector onto the insulation sheet.

10. The lamp socket of claim 1, wherein the insulation sheet comprises a supporting part that holds and supports the bottom of the inverter connector.

11. The lamp socket of claim 1, wherein the first groove and the second groove have opposite opening directions.

12. The lamp socket of claim 1, wherein the lamp socket further comprises an inverter that lodges in the second groove and contacts the inverter connector.

13. A backlight module, comprising:
   a containing box that comprises a bottom plate and a plurality of side walls disposed on the edges of the bottom plate, wherein the edges of the bottom plate have a plurality of openings;
   a plurality of lamps;
   two sets of lamp sockets, each comprising:
      a plurality of lamp holders disposed through the openings, each of the lamp holder comprising:
         a lamp clamp that contacts the lamp;
         a holder connector that connects the lamp clamp, wherein the lamp clamp and the holder connector defines a first groove; and
         an inverter connector that connects the holder connector, wherein the holder connector and the inverter connector defines a second groove; and
      an insulation sheet locked on the bottom plate and lodged in each first groove; and
   an inverter that lodges in the second groove and contacts each inverter connector.

14. The backlight module of claim 13, wherein the backlight module further comprises a plurality of optical sheets disposed on the lamps.

15. The backlight module of claim 13, wherein each holder connector comprises:
   a first bending part;
   a first plank part that connects one side of the first bending part;
   a second bending part that connects one side of the first plank part;
   a second plank part that connects one side of the second bending part;
   a third bending part that connects one side of the second plank part;
   wherein the other side of the first bending part connects the lamp clamp and the other side of the third bending part connects the inverter connector.

16. The backlight module of claim 15, wherein each first groove is surrounded by the lamp holder, the first bending part, the first plank part, the second bending part and the second plank part.

17. The backlight module of claim 16, wherein each first bending part, the second bending part and the third bending part bend perpendicularly.

18. The backlight module of claim 15, wherein each second plank part comprises at least one aperture and the insulation sheet comprises at least one protruding point that lodges in each of the corresponding aperture respectively.

19. The backlight module of claim 18, wherein each second plank part comprises at least one wing region on two sides of the second plank part and the aperture is disposed on the wing region.

20. The backlight module of claim 13, wherein each insulation sheet comprises a plurality of leading inclines that contact each lamp clamp.

21. The backlight module of claim 20, wherein each of the leading inclines comprises a set of lumps disposed on two sides of each leading inclines to help fix each lamp clamp onto each of the leading inclines.

22. The backlight module of claim 13, wherein each insulation sheet comprises a plurality of gaps that hold and fix each holder connector onto the insulation sheet.

23. The backlight module of claim 13, wherein each insulation sheet comprises a plurality of supporting parts that hold and support the bottom of each inverter connector.

24. The backlight module of claim 13, wherein each first groove and each second groove have opposite opening directions.

* * * * *